US009578321B2

(12) United States Patent
Davis (10) Patent No.: US 9,578,321 B2
(45) Date of Patent: Feb. 21, 2017

(54) VIDEO QUALITY MEASUREMENT

(75) Inventor: Andrew G Davis, Woodbridge (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 1438 days.

(21) Appl. No.: 13/000,515

(22) PCT Filed: Apr. 23, 2009

(86) PCT No.: PCT/GB2009/001033
§ 371 (c)(1),
(2), (4) Date: Dec. 21, 2010

(87) PCT Pub. No.: WO2010/004238
PCT Pub. Date: Jan. 14, 2010

(65) Prior Publication Data
US 2011/0102601 A1    May 5, 2011

(30) Foreign Application Priority Data
Jul. 7, 2008 (EP) .................................... 08252312

(51) Int. Cl.
*H04N 17/00* (2006.01)
(52) U.S. Cl.
CPC ................................ *H04N 17/004* (2013.01)
(58) Field of Classification Search
CPC ...... H04N 17/004; H04N 19/44; H04N 19/86; H04N 19/154; H04N 19/17; H04N 19/61; G06T 7/001
(Continued)

(56) References Cited

U.S. PATENT DOCUMENTS 5,654,759 A * 8/1997 Augenbraun et al. ... 375/240.03
6,011,663 A * 1/2000 Inoue et al. .................... 360/48
(Continued)

FOREIGN PATENT DOCUMENTS

EP           0 948 206      10/1999
WO   WO 2004/054274      6/2004
WO   WO 2007/066066      6/2007

OTHER PUBLICATIONS

International Search Report for PCT/GB2009/001033, mailed Jul. 15, 2009.

*Primary Examiner* — Benjamin R Bruckart
*Assistant Examiner* — Jen-Shi Huang
(74) *Attorney, Agent, or Firm* — Nixon & Vanderhye P.C.

(57) ABSTRACT

This invention is concerned with a video quality measurement method, in particular where the video signal having: an original form; an encoded form in which video signal has been encoded using a compression algorithm utilizing a variable quantizer step size such that the encoded signal includes a quantizer step size parameter; and, a decoded form in which the encoded video signal has been at least in part reconverted to the original form. The method comprises the steps of: a) generating a first quality measure which is a function of said quantizer step size parameter; b) generating a masking measure and c) combining the first and second measures. The masking measure is which is a function of the spatial complexity of parts of the frames represented by the video signal in the decoded form, these parts being selected by generating a second measure which is a function of the prediction residual and identifying one or more regions of the picture for which the second measure exceeds a threshold.

20 Claims, 8 Drawing Sheets (58) Field of Classification Search
USPC ...... 348/180–194; 358/504; 455/67.11–67.7;
375/240, 240.16, 240.25, 240.03
See application file for complete search history.

(56) References Cited

U.S. PATENT DOCUMENTS

| | | | |
|---|---|---|---|
| 6,067,118 A * | 5/2000 | Chen et al. | 375/240.03 |
| 6,101,278 A * | 8/2000 | Chen et al. | 382/239 |
| 6,496,221 B1 * | 12/2002 | Wolf et al. | 348/192 |
| 6,810,083 B2 * | 10/2004 | Chen et al. | 375/240.25 |
| 7,869,517 B2 * | 1/2011 | Ghanbari | 375/240.16 |
| 7,873,224 B2 * | 1/2011 | Jalil et al. | 382/232 |
| 7,936,916 B2 * | 5/2011 | Zhang et al. | 382/156 |
| 8,254,438 B2 * | 8/2012 | Davis | 375/240 |
| 2004/0151243 A1 * | 8/2004 | Bhaskaran et al. | 375/240.03 |
| 2008/0317111 A1 * | 12/2008 | Davis | 375/227 |

\* cited by examiner

Figure 2  AvQstep vs. MMOS for training sequences.

Figure 3  AvQstep vs. MMOS for test sequences

Figure 4 CS vs. AvQstep for training sequences

Figure 5 "Harp" decoded intensity (*QPi* =20)

Figure 6    Activity *Act1* for "Harp" (*QPi* =20)

Figure 7    Maximum activity set K1 for "Harp" (*QPi* =20)

Figure 8  Contrast *C0(k4)* for set *K4* for "Harp" (*QPi* =20)

Figure 9  CWS vs. MMOS for training sequences

Figure 10  Measured vs. estimated MOS for AvQstep/CS model

Figure 11  Measured vs. estimated MOS for AvQstep/CWS model

VIDEO QUALITY MEASUREMENT

This application is the U.S. national phase of International Application No. PCT/GB2009/001033 filed 23 Apr. 2009, which designated the U.S. and claims priority to EP Application No. 08252312.7 filed 7 Jul. 2008, the entire contents of each of which are hereby incorporated by reference.

BACKGROUND AND SUMMARY

This invention is concerned with a video quality measure, in particular in situations where a video signal has been encoded using a compression algorithm.

When a video signal is to be transmitted from one location to another, it is known to encode or compress the signal using an encoding algorithm, such that the encoded signal can be transmitted using a lower bandwidth than would be needed without encoding. Upon reception, the encoded signal is decoded to retrieve the original signal. In many encoding techniques, a two dimensional cosines transform is performed, resulting in a series of transform coefficients, whose magnitude is quantized. So that the bandwidth can be allocated efficiently, the granularity of the quantisation, that is, the step size, is allowed to vary.

The process of encoding and decoding the video sequence can introduce distortion or otherwise reduce the quality of the signal. One way of measuring the level of distortion involves noting the opinion of viewers as to the level of perceptible distortion in a distorted video sequence, and averaging the results so as to obtain a Mean Opinion Score (MOS). However, this can be a time consuming process. As a result, it can be desirable to predict the loss of quality that a viewer will perceive in a video sequence. Although the degradation in the video quality as a result of encoding/decoding and the transmission process can be obtained by reference to the original sequence, such an approach is often inconvenient.

In predictive coding, the difference between the actual signal and the predicted one, known as the "prediction residual" may be transmitted. More usually, a quantised version of it is transmitted.

According to our co-pending international patent application WO2007/066066, there is provided a method of generating a measure of quality for a video signal representative of a plurality of frames, the video signal having: an original form; an encoded form in which the video signal has been encoded using a compression algorithm utilising a variable quantiser step size such that the encoded signal has a quantiser step size parameter associable therewith; and, a decoded form in which the encoded video signal has been at least in part reconverted to the original form, the method comprising the steps of: a) generating a first quality measure which is a function of said quantiser step size parameter; b) generating a second quality measure which is a function of the spatial complexity of at least part of the frames represented by the video signal in the decoded form; and, c) combining the first and second measures.

In predictive coding, the difference between the actual signal and the predicted one, known as the "prediction residual" may be transmitted. More usually, a quantised version of it is transmitted.

According to the present invention, there is provided a method of generating a measure of quality for a video signal representative of a plurality of frames, the video signal having: an original form; an encoded form in which the video signal has been encoded using a compression algorithm utilising a variable quantiser step size such that the encoded signal has a quantiser step size parameter associated therewith and utilising differential coding such that the encoded signal contains representations of the prediction residual of the signal; and a decoded form in which the encoded video signal has been at least in part reconverted to the original form, the method comprising:

a) generating a first quality measure which is dependant on said quantiser step size parameter according to a predetermined relationship;
b) generating a masking measure, the masking measure being dependant on the spatial complexity of at least part of the frames represented by the video signal in the decoded form according to a predetermined relationship; and
c) generating a combined measure, the combined measure being dependant upon both the first measure and the masking measure according to a predetermined relationship;
wherein the method also includes
generating a second measure which is dependant on the prediction residual of the signal according to a predetermined relationship;
identifying one or more regions of the picture for which the second measure exceeds a threshold;
and wherein the masking measure is dependant on the spatial complexity of the identified region(s) according to a predetermined relationship.

Other aspects of the invention are set out in the claims.

BRIEF DESCRIPTION OF THE DRAWINGS

Some embodiments of the invention will now be further described, by way of example, with reference to the accompanying drawings, in which:

FIG. 1b illustrates how a vertical contrast measure is calculated for the pixel in the picture of FIG. 1a.

DETAILED DESCRIPTION OF PRESENT EXAMPLE EMBODIMENTS

The embodiments described below relate to a no-reference, decoder-based video quality assessment tool. An algorithm for the tool can operate inside a video decoder, using the quantiser step-size parameter (normally a variable included in the incoming encoded video stream) for each decoded macroblock and the pixel intensity values from each decoded picture to make an estimate of the subjective quality of the decoded video. A sliding-window average pixel intensity difference (pixel contrast measure) calculation is performed on the decoded pixels for each frame and the resulting average (CWS) is used as a measure of the noise masking properties of the video. The quality estimate is then made as a function of the CWS parameter and an average of the step-size parameter. The function is predetermined by multiple regression analysis on a training data base of characteristic decoded sequences and previously obtained subjective scores for the sequences.

The use of the combination of, on the one hand the step-size and, on the other hand, a sliding-window average pixel intensity difference measure to estimate the complexity provides a good estimate of subjective quality.

In principle the measurement process used is applicable generally to video signals that have been encoded using compression techniques using transform coding and having a variable quantiser step size. The versions to be described however are designed for use with signals encoded in accordance with the H.262 and H.264 standards. (Although it also applies to the other DCT based standard codecs, such as H.261, H.263, MPEG-2 (frame based) etc.)

The measurement method is of the non-intrusive or "no-reference" type—that is, it does not need to have access to a copy of the original signal. The method is designed for use within an appropriate decoder, as it requires access to both the parameters from the encoded bitstream and the decoded video pictures.

As a preliminary, it should be explained that the video database used to train and test the technique consisted of eighteen different 8-second sequences, all of 625-line broadcast format. Six of the sequences were from the VQEG Phase I database [7] and the remaining sourced from elsewhere. As the quality parameters were to be based on averages over the duration of each sequence, it was important to select content with consistent properties of motion and detail. Details of the sequences are shown in Table 1.

TABLE 1

Training and test sequences.

| Training Sequence | Characteristics | Test Sequence | Characteristics |
|---|---|---|---|
| Presenter | Local detail and motion. | Athletics | Fast pan and local motion |
| Dance | Fast zoom, high motion, low detail. | Football1 | Fast zoom and pan, local detail and motion |
| Football2 | Fast pan, local detail and motion. | News | Slow zoom, local detail and motion. |
| Ship | Slow pan, water, detail. | Weather | Low motion, high texture. |
| Soap | Slow pan, high contrast, motion. | Fries | Fast pan, film. |
| Barcelona | Saturated colour, slow zoom. | Rocks | Movement, contrast variations. |
| Canoe | Water movement, pan, detail. | Sport | Thin detail, movement. |
| Harp | Slow zoom, thin detail. | Calendar | High detail, slow pan. |
| View | Slow movement, detail. | Rugby | Movement, fast pan. |

Encoding

All of the training and test sequences were encoded using a H.262 encoder with the same encoder options set for each. A frame pattern of I,P,B,P,B,P was used with rate control disabled and quantisation parameter QP fixed. The quantiser step-size parameters were then incremented between tests for each source file.

Formal single-stimulus subjective tests were performed using 12 subjects for both training and testing sets. Subjective scores were obtained using a 5-grade ACR rating scale. Averaged mean opinion scores results MMOS are shown in Table 2 (training set) and Table 3 (test set).

TABLE 2

Subjective scores for training sequences.

| | QP-P, QP-B | | | | | | | | | | | |
|---|---|---|---|---|---|---|---|---|---|---|---|---|
| Sequence | 6 | 8 | 10 | 12 | 14 | 16 | 18 | 20 | 22 | 24 | 26 | 32 |
| Presenter | 5.0 | 4.5 | 4.75 | 4.0 | 3.67 | 3.17 | 2.83 | 2.17 | 2.42 | 1.92 | 1.42 | 1.08 |
| Dance | 4.17 | 4.42 | 4.42 | 4.25 | 4.0 | 3.92 | 3.42 | 3.33 | 2.83 | 2.33 | 1.92 | 1.33 |
| Football2 | 4.33 | 4.08 | 4.08 | 3.5 | 3.08 | 3.25 | 2.58 | 2.08 | 1.42 | 1.75 | 1.0 | 1.0 |
| Ship | 5.0 | 4.75 | 4.50 | 3.92 | 4.08 | 3.83 | 3.25 | 2.75 | 2.08 | 1.92 | 1.58 | 1.33 |
| Soap | 4.83 | 4.42 | 4.42 | 4.17 | 3.5 | 3.17 | 2.50 | 2.58 | 1.83 | 1.67 | 1.08 | 1.08 |
| Barcelona | 4.83 | 4.5 | 4.5 | 4.08 | 4 | 3.33 | 2.92 | 2.67 | 2.5 | 1.83 | 1.58 | 1.25 |
| Canoe | 4.67 | 4.92 | 4.67 | 4.75 | 4 | 3.67 | 3.33 | 3.17 | 2.58 | 1.92 | 1.92 | 1.33 |
| Harp | 4.42 | 4.83 | 4.75 | 4.42 | 4.25 | 4.42 | 3.58 | 3.25 | 3.08 | 2.75 | 2.25 | 1.25 |
| View | 4.42 | 4.83 | 4.75 | 4.5 | 4.92 | 4.5 | 4 | 4.08 | 3.67 | 2.92 | 2.67 | 1.75 |

TABLE 3

Subjective scores for test sequences.

| | QP-P, QP-B | | | | | | | | | | | |
|---|---|---|---|---|---|---|---|---|---|---|---|---|
| Sequence | 6 | 8 | 10 | 12 | 14 | 16 | 18 | 20 | 22 | 24 | 26 | 32 |
| Athletics | 4.83 | 4.83 | 4.50 | 4.42 | 4.08 | 3.50 | 2.75 | 2.75 | 2.50 | 2.08 | 1.42 | 1.0 |
| Football1 | 5.0 | 4.75 | 4.25 | 3.92 | 3.50 | 3.42 | 2.33 | 2.0 | 2.0 | 1.75 | 1.17 | 1.17 |
| News | 4.67 | 4.42 | 4.0 | 3.58 | 3.33 | 3.08 | 2.83 | 2.17 | 2.08 | 1.92 | 1.67 | 1.17 |
| Weather | 4.67 | 4.75 | 4.0 | 3.92 | 3.58 | 3.08 | 2.42 | 2.50 | 2.33 | 1.92 | 1.75 | 1.42 |
| Fries | 4.58 | 4.67 | 4.58 | 4 | 4.08 | 4 | 3.5 | 3.25 | 2.83 | 2.25 | 2 | 1.17 |
| Rocks | 4.75 | 4.67 | 4.42 | 4 | 4.08 | 4.08 | 3.58 | 3.08 | 3.08 | 2.75 | 2.17 | 1.33 |
| Sport | 4.5 | 5 | 4.67 | 4.5 | 4.25 | 4.33 | 3.58 | 3.5 | 2.67 | 2.17 | 1.92 | 1.5 |
| Calendar | 4.92 | 4.58 | 4.25 | 3.92 | 4.08 | 3.92 | 3.42 | 3.33 | 3.08 | 2.5 | 2.17 | 1.5 |
| Rugby | 4.67 | 4.17 | 4.17 | 4.33 | 4.5 | 3.75 | 3.25 | 2.75 | 2.42 | 1.92 | 1.42 | 1.08 |

Figure 1:
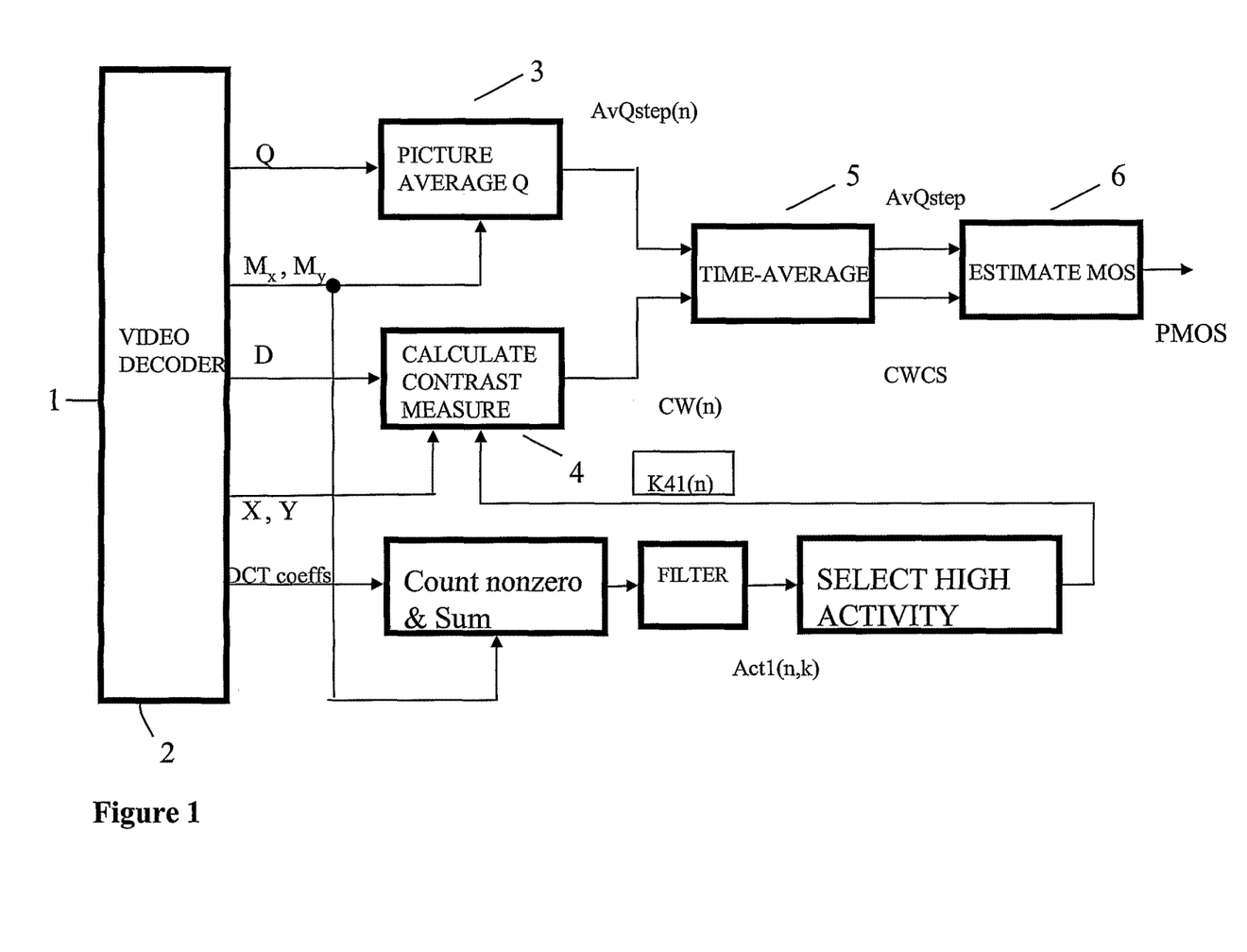
FIG. 1 is a block diagram showing in functional terms apparatus for estimating the quality of a video sequence.

In the apparatus shown in FIG. 1, the incoming signal is received at an input 1 and passes to a video decoder which decodes and outputs the following parameters for each picture:
Decoded picture (D).
Horizontal decoded picture size in pixels (X)
Vertical decoded picture size in pixels (Y)
Horizontal decoded picture in macroblocks ($M_x$)
Vertical decoded picture size in macroblocks ($M_y$)
Set of quantiser step-size parameters (Q)
DCT coefficients (R).

There are two analysis paths in the apparatus, which serve to calculate the picture-averaged quantiser step-size signal AvQstep(n) (unit 3) and the picture-averaged contrast measure CWS (unit 4). Unit 5 then time averages signals AvQstep(n) and CW(n) to give signals AvQstep and CWS respectively. Finally, these signals are combined in unit 6 to give an estimate PMOS of the subjective quality for the decoded video sequence D. The elements 3 to 6 could be implemented by individual hardware elements but a more convenient implementation is to perform all those stages using a suitably programmed processor.

Picture-Average Q

A first version of this, suited to H.264, uses the quantiser step size signal, Q, output from the decoder. Q contains one quantiser step-size parameter value, QP, for each macroblock of the current decoded picture. For H.264, the quantiser parameter QP defines the spacing, QSTEP, of the linear quantiser used for encoding the transform coefficients. In fact, QP indexes a table of predefined spacings, in which QSTEP doubles in size for every increment of 6 in QP. The picture-averaged quantiser parameter QPF is calculated in unit 3 according to $$QPF = (1/M_X^* M_Y) \sum_{i=0}^{M_X-1} \sum_{j=0}^{M_Y-1} Q(i,j) \qquad (0)$$

where Mx and My are the number of horizontal and vertical macroblocks in the picture respectively and Q(i,j) is the quantiser step-size parameter for macroblock at position (i,j).

The quantization process in H.262 is slightly less amenable to the analysis that is defined above for H.264 main-profile. Therefore, some modifications have been necessary. In H.262, the quantization process differs between intra DC coefficients and all other transform coefficients. For simplicity, the analysis of quantization effects will be restricted to AC transform coefficients only.

For AC transform coefficients, the amount of quantization noise introduced by the encoding process is determined by a combination of the quantizer scaling factor, QP, and a weighting matrix, qWeight. Factor QP is a constant for the quantization of all DCT coefficients within a macroblock, but may be differentially varied between macroblocks (i.e. a small change +/- from that of the previous macroblock). Matrix qWeight provides user-defined weighting factors for each element of the 8×8 DCT matrix and would typically be set at encoder initialization. It is the same for each macroblock, as it is only set at a sequence level.

For macroblock k within frame n, DCT coefficient element j that is quantised to a level number lev will be decoded to coefficient qDCT according to (1)

$$qDCT=((2*lev)+c)*qWeight(j)*QP(n,k)/32 \ n \in N \ k \in K(n) \qquad (1)$$

where N represents the set of frames in the video sequence and K(n) the set of macroblocks to be analysed within frame n. Variable c is a sign offset that has one value of $\{-1,0,+1\}$ as defined in [2].

The actual quantization step size Qstep for element j may be calculated by $$Qstep(n,k,j)=QP(n,k)*qWeight(j)/16 \ n \in N \ k \in K(n) \qquad (2)$$

The scaling factor QP is set through an index QPi to one of a fixed set of predefined values. Two sets of values are defined by the standard, providing a choice of linearly or non-linearly spaced parameters as shown in table 4.

TABLE 4

| MPEG-2 Quantizer scaling arrays | |
|---|---|
| linear_QP_array[32] | non_linear_QP_array [32] |
| 0, 2, 4, 6, 8, 10, 12, 14, | 0, 1, 2, 3, 4, 5, 6, 7, |
| 16, 18, 20, 22, 24, 26, 28, 30, | 8, 10, 12, 14, 16, 18, 20, 22, |
| 32, 34, 36, 38, 40, 42, 44, 46, | 24, 28, 32, 36, 40, 44, 48, 52, |
| 48, 50, 52, 54, 56, 58, 60, 62 | 56, 64, 72, 80, 88, 96, 104, 112 |

A weighted quantization parameter wQstep may be defined to reflect the effects of the weighting matrix for each macroblock.

$$wQstep(n,k) = \frac{1}{16} QP(n,k) * f(qWeight) \ n \in N \ k \in K(n) \qquad (3)$$

In (3), f( ) is a function of the weighting matrix qWeight and may be defined according to (4).

$$f0 = \frac{1}{Jtot} \sum_{j \in J} qWeight(j) \qquad (4)$$

In (4), J defines the set of transform coefficients over which the average is to be performed and Jtot equals the number of members in that set.

In-depth consideration of the effects of the weighting matrix qWeight is beyond the scope of this investigation, but two different definitions of set J were tested:
J1={3 highest frequency AC coefficients (irrespective of whether they are active or not)}
J2={all active (non-zero) AC coefficients}

For frame n, an average step-size measure AvQstep(n) may be calculated according to (5).

$$AvQstep(n) = \frac{1}{Ktot} \sum_{k \in K(n)} wQstep(n,k) \ n \in N \qquad (5)$$

K(n) defines the set of macroblocks in frame n over which the analysis is to be performed. Typically this will be the whole picture except for edge regions—i.e. the picture is cropped, to avoid boundary effects due to the presence of video that has itself been cropped. The centre of the picture is usually the most important for visual attention.

A sequence-averaged measure of average quantizer step-size may be calculated according to (6).

$$AvQstep = \frac{1}{Ntot} \sum_{n \in N} AvQstep(n) \qquad (6)$$

Figure 2:
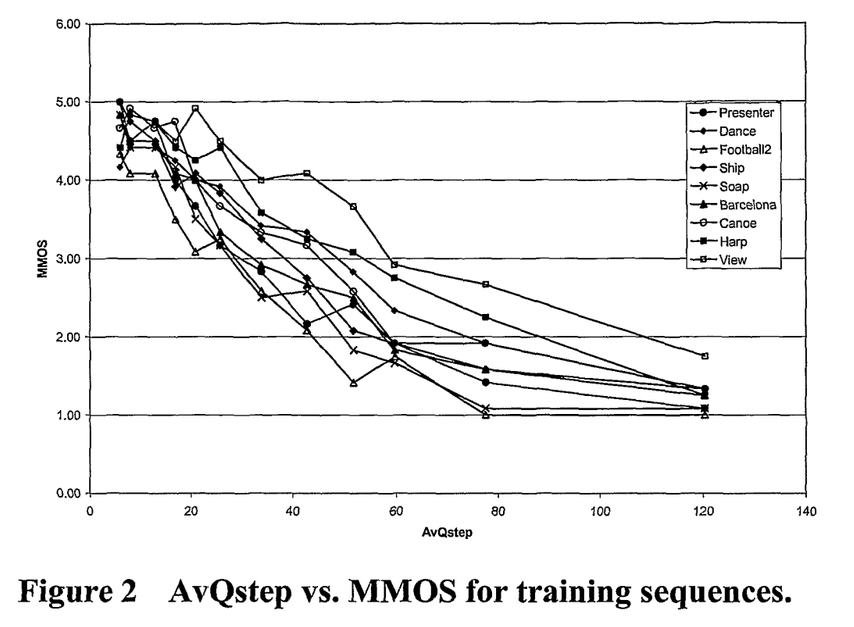
FIGS. 2 to 11 are plots showing the result of tests on the system of FIG. 1.
Figure 3:
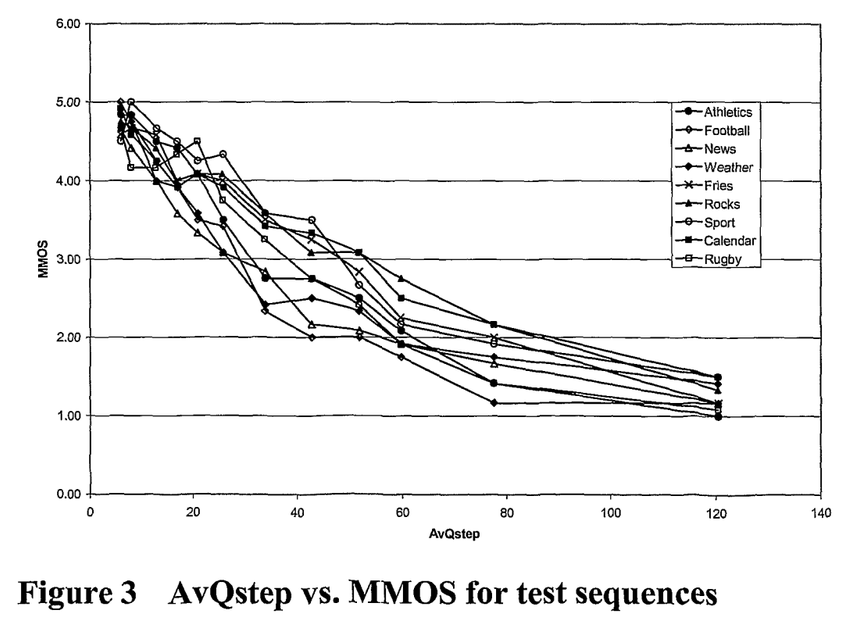

For each test, the weighting matrix was fixed and the value of QP was set according to a QPi value from 6,8,10, 12,14,16,18,20,22,24,26 and 32. AvQstep was determined for each test according to (6) and using set J1 in (4). FIG. 2 shows AvQstep against measured mean-opinion score MMOS for each of the 9 training sequences and FIG. 3 shows the same for the 9 test sequences. The sequence-average was taken over sequences of 8 seconds duration at 25 frames per second—i.e. with N=200 in Equation 6.

FIGS. 2 and 3 illustrate that AvQstep is a good basic predictor of subjective score MMOS and that there is quite a consistent separation of the curves by content type. Correlation between AvQstep and MMOS was calculated to be 0.89 for the training set and 0.91 for testing (see Table 4).

Note that, for H.264, a quantizer weighting matrix (similar principle to H.262) may be defined in the "High Profile". The weighting matrix can be defined on a sequence or picture level as "Flat", "Default non-flat" or "User-defined" and is applied to 4×4Intra, 4×4Inter, 8×8Intra and 8×8Inter transforms (8×8 transform is only available in High Profile). A similar approach to that suggested for H.262 may also be used for H.264 High Profile.

Calculate Contrast Measure

Distortion masking is an important factor affecting the perception of distortion within coded video sequences. Such masking occurs because of the inability of the human perceptual mechanism to distinguish between signal and noise components within the same spectral, temporal or spatial locality. Such considerations are of great significance in the design of video encoders, where the efficient allocation of bits is essential. Research in this field has been performed in both the transform and pixel domains [8,9,10], but for CS only the pixel domain is considered.

Figure 1A:
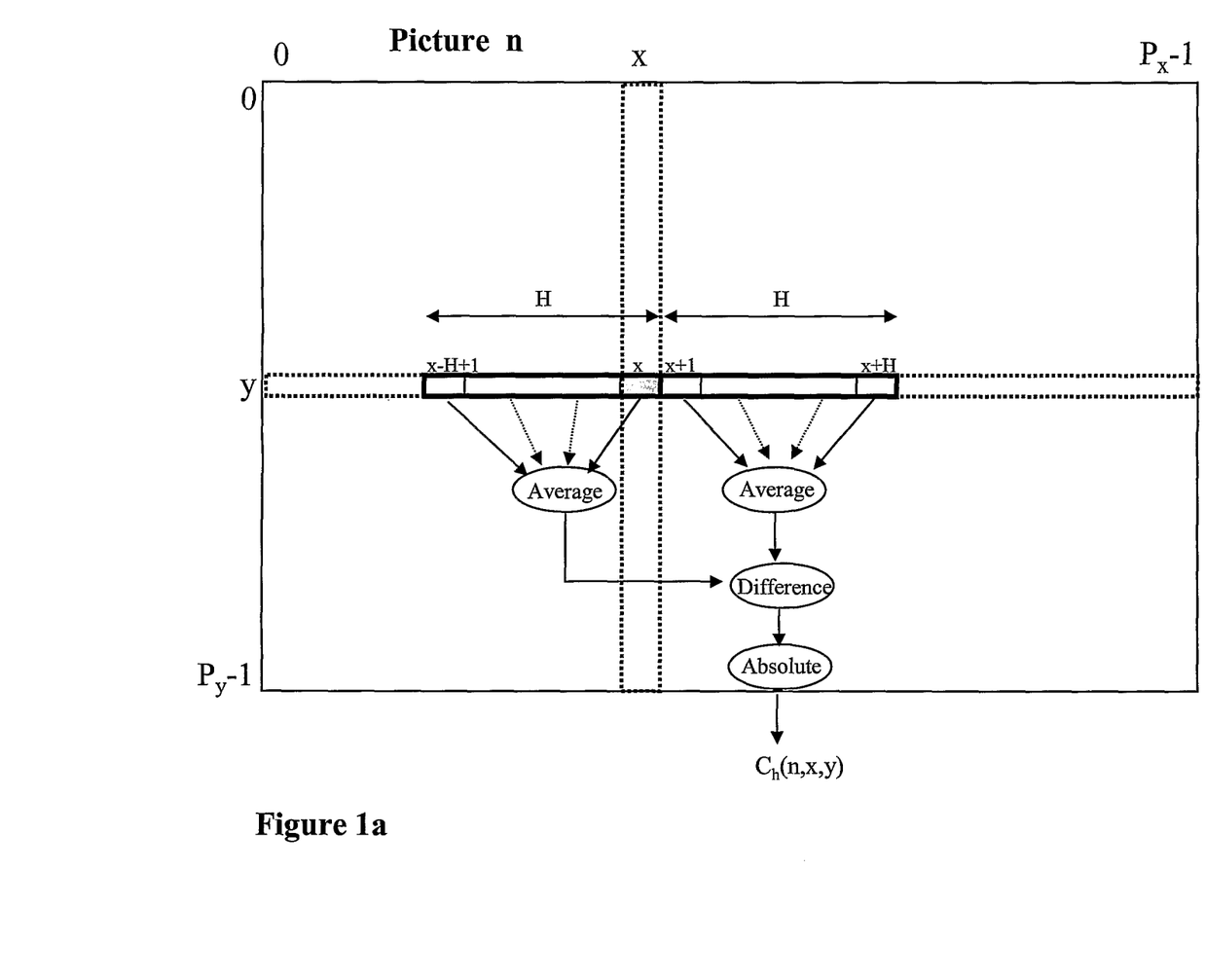
FIG. 1a illustrates how a horizontal contrast measure is calculated for a pixel in a picture.
Figure 1B:
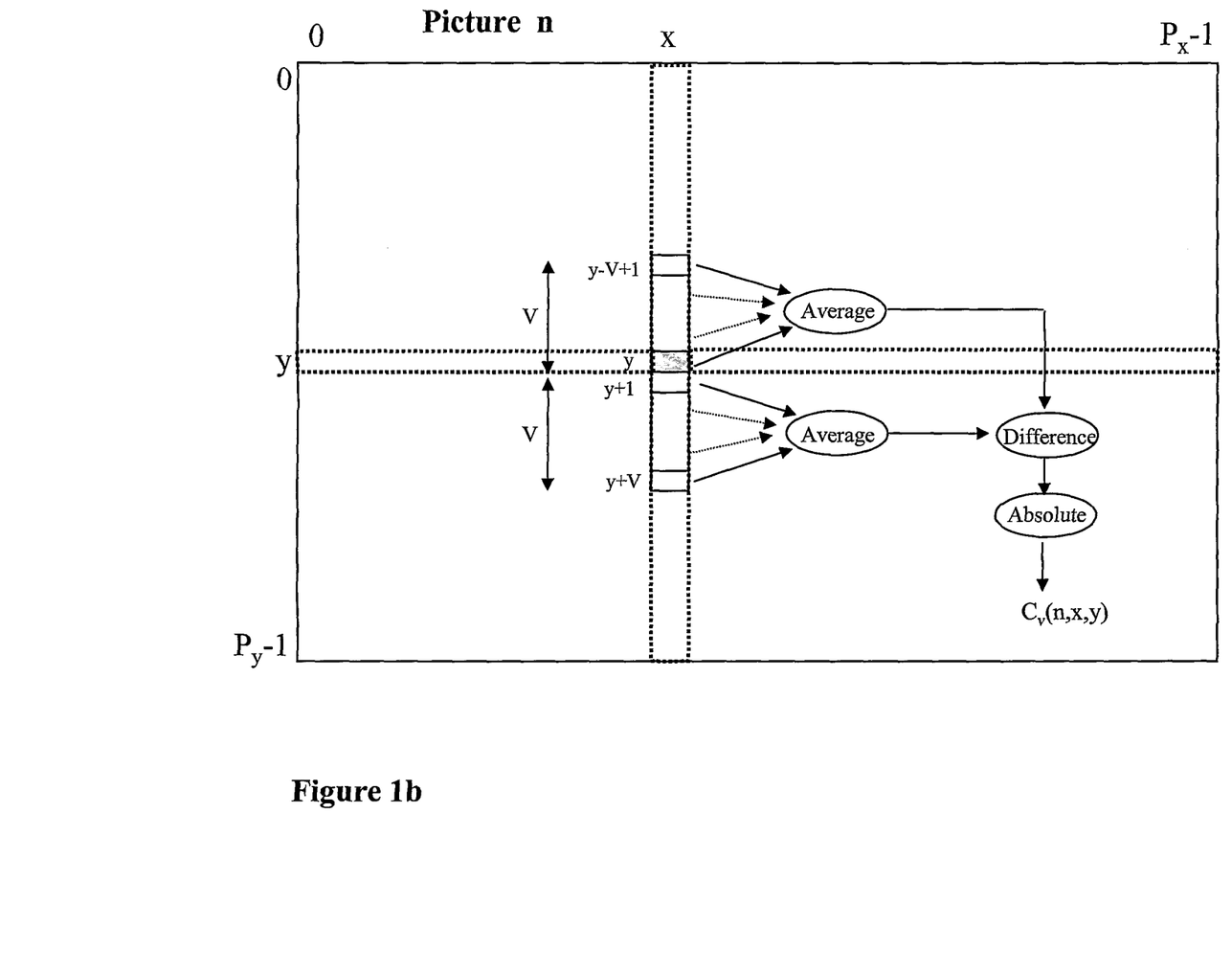

FIGS. 1a and 1b illustrate how the contrast measure is calculated for pixels p(x,y) at position (x,y) within a picture of size X pixels in the horizontal direction and Y pixels in the vertical direction.

The analysis to calculate the horizontal contrast measure is shown in FIG. 2. Here, the contrast measure is calculated in respect of pixel p(x,y), shown by the shaded region. Adjacent areas of equivalent size are selected (one of which includes the shaded pixel) Each area is formed from a set of (preferably consecutive) pixels from the row in which the shaded pixel is located. The pixel intensity in each area is averaged, and the absolute difference in the averages is then calculated according to equation (2) below, the contrast measure being the value of this difference. The vertical contrast measure is calculated in a similar fashion, as shown in FIG. 3. Here, an upper set of pixels and a lower set of pixels are select. Each of the selected pixels lies on the same column, the shaded pixel next to the border between the upper and lower sets. The intensity of the pixels in the upper and lower sets is averaged, and the difference in the average intensity of each set is then evaluated, the absolute value of this difference being the vertical contrast measure as set out in equation (3) below, that is, a measure of the contrast in the vertical direction. In the present example, the shaded pixel is included in the lower set. However, the position of the pixel with which the contrast measure is associated is arbitrary, provided that it is in the vicinity of the boundary shared by the pixels sets being compared.

Thus, to obtain the horizontal contrast measure, row portions of length H1 and H2 are compared, whereas to obtain the vertical contrast measure, column portions of length V1 and V2 are compared (the length H1, H2 and V1, V2 may but need not be the same). The contrast measure is associated with a pixel whose position is local to the common boundary of, on the one hand, the row portions and on the other hand the column portions.

The so-calculated horizontal contrast measure and vertical contrast measure are then compared, and the greater of the two values (termed the horizontal-vertical measure as set out in equation (4)) is associated with the shaded pixel, and stored in memory.

This procedure is repeated for each pixel in the picture (within vertical distance V1, V2 and horizontal distances H1, H2 from the vertical and horizontal edges of the picture respectively), thereby providing a sliding window analysis on the pixels, with a window size of H1, H2, V1 or V2. The horizontal-vertical measure for each pixel in the picture (frame) is then averaged and this overall measure associated with each picture is then averaged over a plurality of pictures to obtain a sequence-averaged measure. The number of pictures over which the overall measure is averaged will depend on the nature of the video sequence, and the time between scene changes, and may be as long as a few seconds. Only part of a picture need be analysed in this way, as will be described in more detail below.

By measuring the contrast at different locations in the picture and taking the average, a simple measure of the complexity of the picture is obtained. Because complexity in a picture can mask distortion, and thereby cause an observer to believe that a picture is of a better quality for a given distortion, the degree of complexity in a picture can be used in part to predict the subjective degree of quality a viewer will associate with a video signal.

The width or height of the respective areas about the shaded pixel is related to the level of detail at which an observer will notice complexity. Thus, if an image is to be viewed from afar, these will be chosen so as to be larger than in situations where it is envisaged that the viewer will be closer to the picture. Since in general, the distance from a picture at which the viewer will be comfortable depends on the size of the picture, the size will also depend on the pixel size and the pixel dimensions (larger displays typically have larger pixels rather than more pixels, although for a given pixel density, the display size could also be a factor). Typically, it is expected that H1, H2 and V1, V2 will each be between 0.5% and 2% of the respective picture dimensions. For example, the horizontal values could be 4*100/720=0.56%, where there are 720 pixels horizontally and each set for average contains 4 pixels, and in the vertical direction, 4*100/576=0.69% where there are 576 pixels in the vertical direction.

In more detail, pixel difference contrast measures $C_h$ and $C_v$ are calculated according to $$C_h(n, x, y) = \text{abs}\left(\left((1/H1)\sum_{j=0}^{H1-1} d(n, x-j, y)\right) - \left(\left(1/H2 \sum_{j=0}^{H2-1} d(n, x+1+j, y)\right)\right)\right) \quad (7)$$

$$x = H1 - 1 \ldots X - H2 - 1$$
$$y = 0 \ldots Y - 1$$

where d(n,x,y) is the pixel intensity value (0..255) within the n'th frame of N from decoded sequence d of dimension of X horizontal (x=0 . . . X−1) and Y vertical (y=0 . . . Y−1) pixels.

$$C_v(n, x, y) = \qquad (8)$$

$$abs\left(\left((1/V1)\sum_{j=0}^{V1-1} d(n, x, y-j)\right) - \left((1/V2)\sum_{j=0}^{V2-1} d(n, x, y+1+j)\right)\right)$$

$$x = 0 \ldots X-1$$

$$y = V1-1 \ldots Y-V2-1$$

where H1 and H2 are the window lengths for horizontal pixel analysis and V1 and V2 are the window lengths for vertical pixel analysis.

$C_h$ and $C_v$ may then be combined to give a horizontal-vertical measure $C_{hv}$, $$C_{hv}(n,x,y) = \max(C_h(n,x,y), C_v(n,x,y))$$

$$x = H1-1 \ldots X-H2-1$$

$$y = V1-1 \ldots Y-V2-1 \qquad (9)$$

In our earlier patent application, $C_{hv}$ was then used to calculate an overall pixel difference measure, CF, for a frame according to $$CF(n) = \qquad (10)$$

$$(1/(X+1-H1-H2)(Y+1-V1-V2)) \sum_{y=V1-1}^{Y-V2-1} \sum_{x=H1-1}^{X-H2-1} C_{hv}(n, x, y)$$

and in turn a sequence-averaged measure CS, $$CS = (1/N) \sum_{n=0}^{N-1} CF(n) \qquad (11)$$

Figure 4:
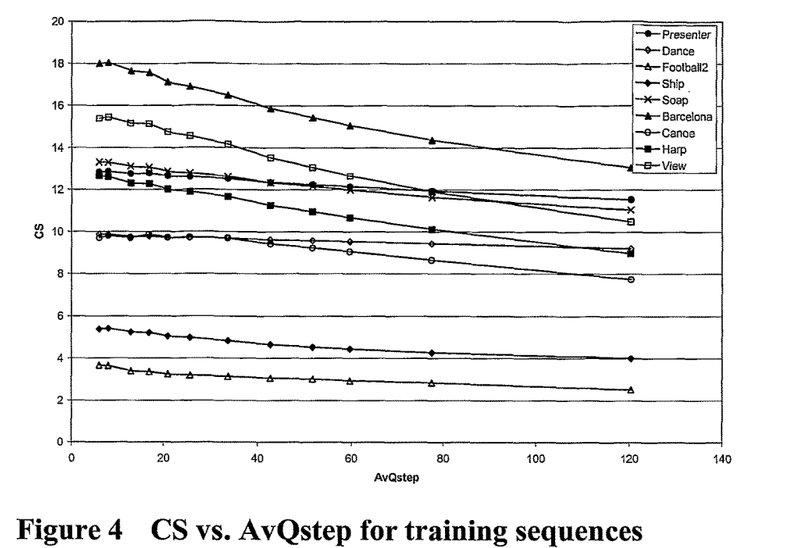

The sequence-averaged measure CS was calculated for each of the decoded training sequences using H1=4, H2=1 and V1=2, V2=1 and the results, plotted against AvQstep, are shown in FIG. 4.

Results from our earlier patent application show the measure CS to be related to the noise masking properties of the sequences. High CS suggests high masking and therefore higher MMOS for a given quantizer step-size. The potential use of the CS measure in no-reference quality estimation was tested by its inclusion in the multiple regression analysis described below.

Figure 5:
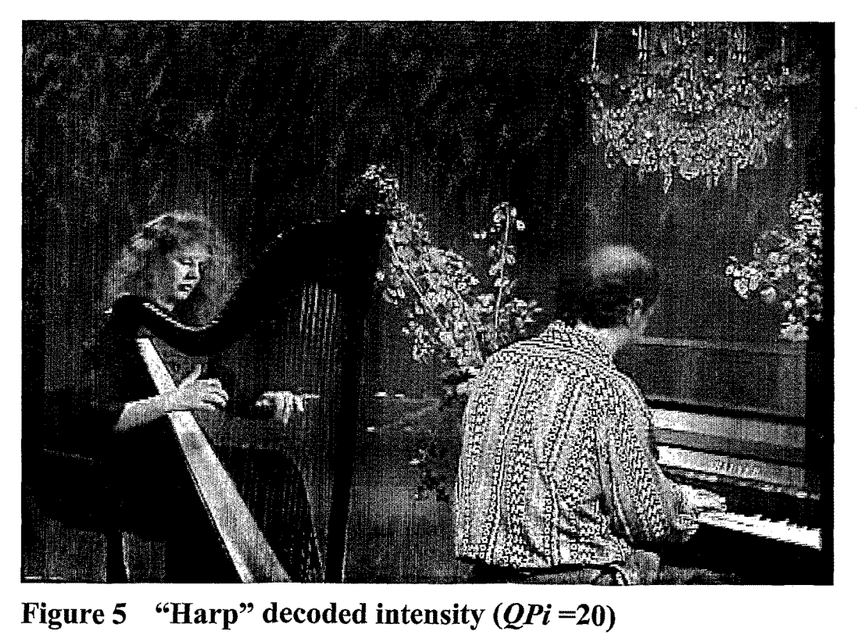

The sequence-averaged contrast measure CS utilized a whole-image average CF of horizontal and vertical pixel-difference measures. Such a measure can have difficulties with images which contain large areas of well coded plain areas, as such areas would potentially have little visual impact but significantly affect the magnitude of CF and in turn CS. An example of this effect may be found for the "Harp" test sequence (FIG. 5) which is near top-rated for quality (FIG. 2), but mid-rated for masking (FIG. 4). To better handle such content, a measure of regional importance is used to focus the analysis on parts of the image that have higher degrees of motion and detail.

Typical hybrid video coding algorithms, such as H.262, H.263 and H.264, include functions for the prediction of pixel blocks, transformation of the resulting difference blocks, quantization of the transformed coefficients and entropy coding of these quantized symbols. The encoding of broadcast format video sequences at bit rates <10 Mbit/s will typically result in the majority of the transform coefficients being quantized to zero. A high proportion of non-zero quantized coefficients will tend to indicate a region that is difficult to predict and with a high degree of detail. These regions are potentially useful for regional analysis as they tend to attract visual attention and are subjected to higher quantization effects.

It is convenient to base the regional analysis about the regular macroblock structures found in these encoders. For frame number n, a measure of DCT activity Act1 may be calculated for a macroblock k according to $$Act1(n, k) = \sum_{m \in M(n,k)} TCount(m) \; n \in N \; k \in K(n) \qquad (12)$$

TCount(m) represents the sum a count of the number of non-zero quantized transform coefficients within macroblock m.

M(n,k) defines a set of macroblocks centred on macroblock k over which a sum is to be performed.

K(n) defines the set of macroblocks to be considered in frame n

N defines the set of frames in the sequence to be considered.

Results for non-overlapping areas of M may be achieved by either restricting the set K(n) of the centre values for M according to the shape and size of M or by suitable filtering of Act1( ) after an initial overlapping analysis. Here, the second approach is favoured with filtering of Act1 according to the following steps:

1. Initialise a temporary set KMAX of search MBs for picture n as KMAX=K(n)
2. If Act1(n,k)=0 for all k ∈ KMAX then goto 7
3. Find $k_{max}$=k such that Act1(n,k) is maximum for k ∈ KMAX
4. Set Act1(n,m)=0 for (m∈M(n, $k_{max}$)∩(m≠$k_{max}$))
5. Remove element $k_{max}$ from set KMAX
6. Return to 2
7. End (12) was applied to an MPEG2 encoding of the "Harp" sequence with M(n,k) defining a 3×3 area of macroblocks cantered on macroblock k and K defines macroblocks covering a cropped area of the image. Non-overlapping filtering of Act1 was applied as described above.

Figure 6:
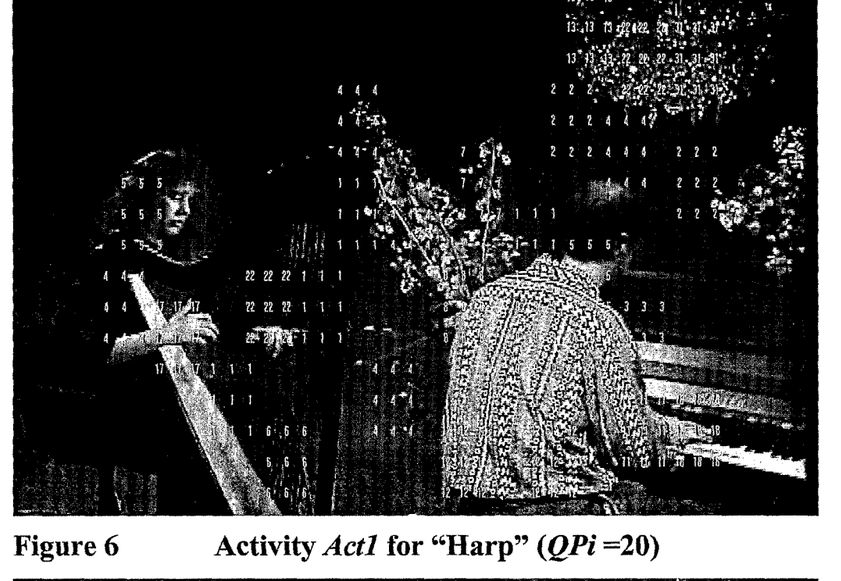

FIG. 6 shows an example of the resulting activity map. FIG. 6 shows the highest activity in areas of motion (hands) and high detail and unpredictability (chandelier and parts of shirt). For frame n, a region of maximum activity K1(n) may then be defined by applying a threshold to the activity array Act1 according to (13).

$$K1(n) = \{k1: Act1(n,k1) > Thresh1(n) \wedge k1 \in K(n)\} n \in N \qquad (13)$$

meaning the set of all k1 of the larger set K1(n) that satisfy the condition Act1(n,k1)>Thresh1(n).

Thresh1 may be defined as a function of the maximum activity within a picture according to (14).

$$Thresh1(n) = \frac{Thresh1PerCent}{100.0} * \max_{k \in K(n)} (Act1(n, k)) \; n \in N \qquad (14)$$

Figure 7:
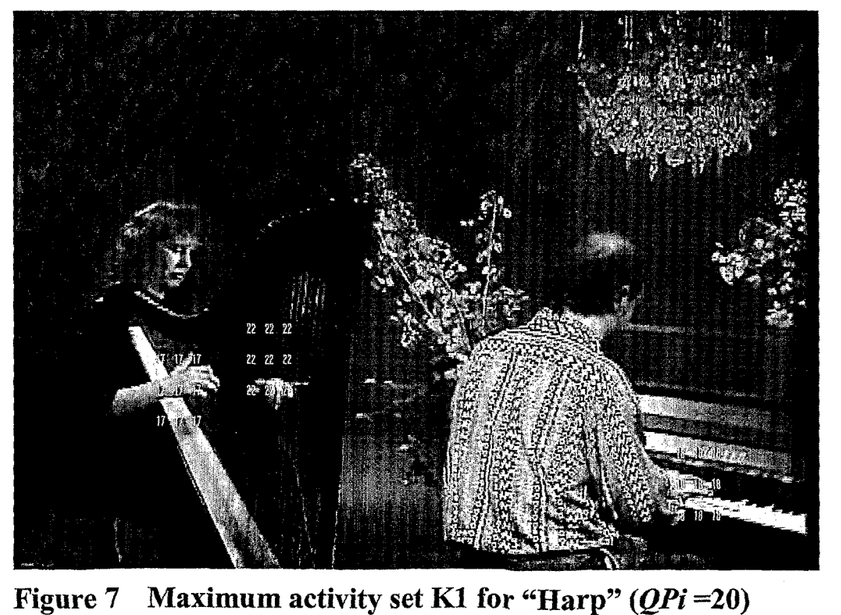

FIG. 7 shows the effect of applying a 50% activity threshold to the map from FIG. 6. For display purposes the areas of activity are shown by repeating the relevant values of Act1 over the 3×3 macroblock analysis areas.

The areas shown may be considered to be an estimate of the regions where quantization effects will be at a maximum. An estimate of the significance of these regions may be made by comparing their masking properties with those of the remaining picture.

If K1 signifies the region or regions, taken together, of maximum activity, firstly the masking properties of K1 are estimated by calculating an average contrast function according to (15)

$$C1(n) = \frac{1}{K1tot(n)} \sum_{k1 \in K1(n)} C0(k1) \; n \in N \quad (15)$$

where K1tot(n) equals the number of members of the set K1(n) and C0(k1) is a measure of contrast for the pixel area covered by M(n,k1).

Thus, C0(k1) is defined as the pixel contrast measure $C_{hv}$ from Equations (7) to (9) summed over the macroblock represented by k1: then $$C0(k1) = \sum_{x,y \in k1} \sum C_{hv}(n, x, y) \, k1 \in K1(n) \quad (16)$$

where x,y are the pixel coordinates of the respective pixel k1.

The area of the picture that is within the initial analysis region K(n) but not included in the region of maximum activity K1(n) is also important. This region may be defined as K2(n) whose members k2 obey (17).

$$K2(n) = \{k2 : k2 \in K(n) \wedge k2 \notin K1(n)\} \quad (17)$$

Whilst region K2 is assumed to have less visible distortion than region K1, its contrast properties can have an important effect on the perception of the overall distortion. Region K2 may have high contrast areas that have been well predicted and therefore not included in region K1. However, such areas might draw visual attention and provide general masking of distortions in K1. Areas of picture within K2 that have contrast properties comparable with those in K1 are included in the analysis of the cropped picture K by using a threshold C0Thresh(n) to define a set K3(n) according to (18)

$$K3(n) = \{k3 : C0(k3) > C0Thresh(n) \wedge k3 \in K2(n)\} n \in N \quad (18)$$

$$C0Thresh(n) = C1(n) \quad (19)$$

A threshold of C0Thresh equal to the average of contrast measure over the region of maximum activity K1 was found to be suitable for the sequences tested. The high activity region K1 and the region K3 that has low-activity but significant contrast may be combined to make region K4 according to (20).

$$K4 = \{k4 : k4 \in (K1 \cup K3)\} \quad (20)$$

Figure 8:
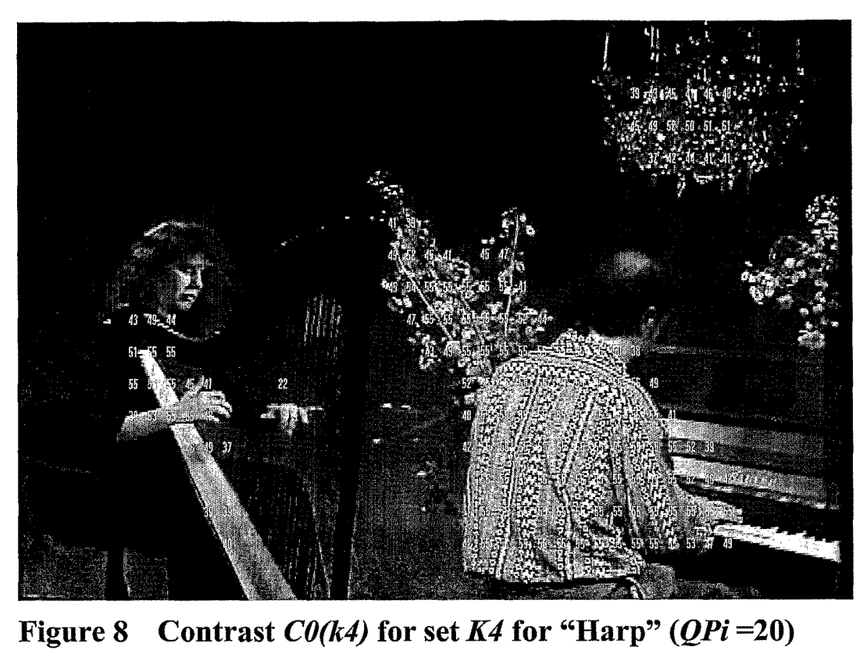

Contrast analysis was performed on the "harp" sequence according to equations (15) to (20) and the results for region K4 of a single field are shown in FIG. 8.

A weighted contrast measure CW for each frame may now be defined according to (21)

$$CW(n) = \frac{1}{K4tot(n)} \sum_{k \in K4(n)} C0(k) \; n \in N \quad (21)$$

K4tot(n) equals the number of members of the set K4 for frame n. In turn, a sequence-averaged regionally weighted contrast measure CWS may be calculated according to (22).

$$CWS = \frac{1}{Ntot} \sum_{n \in N} CW(n) \quad (22)$$

Figure 9:
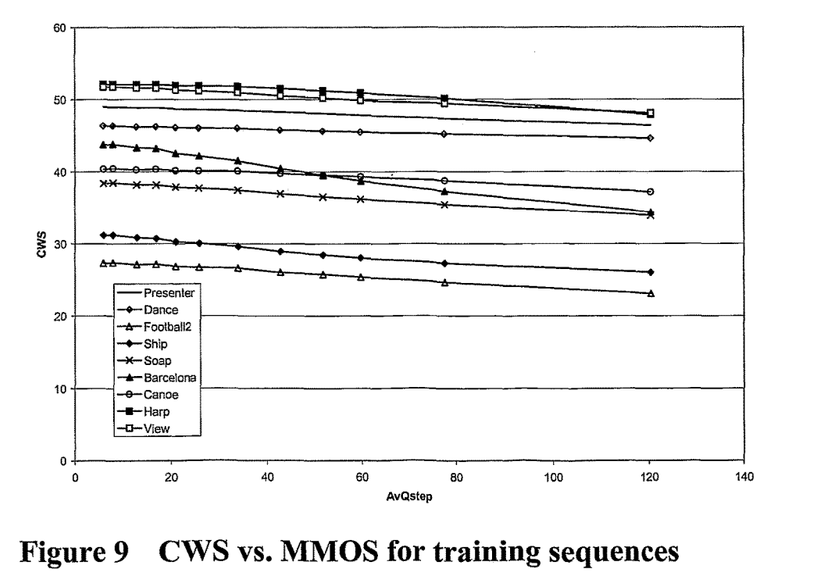

The sequence-averaged measure CWS was calculated for each of the decoded training sequences using and the results, plotted against average quantizer step size, are shown in FIG. 9.

The CWS results in FIG. 9 show encouraging differences to the corresponding CS results in FIG. 4. The two sequences "Harp" and "View", which have similar properties of low-motion and plain backgrounds, have moved to be top ranked by CWS rather than upper-middle ranked by CS. This shows excellent alignment with MMOS ranking in FIG. 2. Similarly, sequence "Barcelona" moves from CS top-ranked to CWS mid-ranked, which more closely aligns with its MMOS mid-ranking in FIG. 2.

The parameter averaging, here as for the quantiser step size, should be performed over the time-interval N for which the MOS estimate is required. This may be a single analysis period yielding a single pair of AvQstep and CWS parameters or maybe a sequence of intervals yielding a sequence of parameters. Continuous analysis could be achieved by "sliding" an analysis window in time through the time sequences, typically with a window interval in the order of a second in length.

The activity measure Act1 discussed above is one example of measure that is a function of the prediction residual, typically calculated from the transform coefficients. The count of nonzero coefficients works well, but a measure that also depends on the amplitudes of the coefficients, such as the total energy can also be used, or a combination of the count and the energy.

Estimate MOS

Model Design

The sequence-averaged measures of quantizer step-size, AvsQtep, and weighted contrast, CWS, (or alternatively pixel contrast, CS) are used to make an estimate, PMOS, of the corresponding subjectively measured mean opinion scores, MMOS. PMOS is calculated from a combination of the parameters according to (23).

$$PMOS = F_1(AvQ\text{step}) + F_2(CWS) + K_0 \quad (23)$$

$F_1$ and $F_2$ are suitable linear or non-linear functions in AvQstep and CWS. $K_0$ is a constant.

PMOS is in the range 1 . . . 5, where 5 equates to excellent quality and 1 to bad. $F_1$, $F_2$ and $K_0$ may be determined by suitable regression analysis (e.g. linear, polynomial or logarithmic) as available in many commercial statistical software packages. Such analysis requires a set of training sequences of known subjective quality. The model, defined by $F_1$, $F_2$ and $K_0$, may then be derived through regression analysis with MMOS as the dependent variable and AvQstep and CWS as the independent variables. The resulting model would typically be used to predict the quality of test sequences that had been subjected to degradations. (codec type and compression rate) similar to those used in training. However, the video content might be different.

For the MPEG-2 encoded full resolution broadcast sequences presented here, a suitable non-linear model was found to be:

$$PMOS=-0.013*AvQstep-1.749*\log 10(AvQstep)+0.29*CWS+5.122 \quad (24)$$

The resulting estimate would then be limited according to:

if $(PMOS>5)PMOS=5$ if $(PMOS<1)PMOS=1$ (25)

The parameter averaging should be performed over the time-interval for which the MOS estimate is required. This may be a single analysis period yielding a single pair of AvQstep and CWS parameters, as in the calibration of the model, or maybe a sequence of intervals yielding a sequence of parameters. Continuous analysis could be achieved by "sliding" an analysis window in time through the AvQstep and CWS time sequences, typically with a window interval in the order of a second in length.

Results

Firstly, MMOS (dependent variable) for the training set was modelled by AvQstep (independent variable) using standard linear and polynomial/logarithmic regression analysis as available in many commercial statistical software packages. The resulting model was then used on the test sequences. This was then repeated using CS and then CWS as additional independent variables. For each model the correlation between estimated and measured mean opinion scores (PMOS and MMOS) and RMS residuals are shown in table 5.

TABLE 5

Correlation and RMS residual between MMOS and PMOS.

| Sequence set | AvQstep | AvQstep | AvQstep, CS | AvQstep, CWS |
|---|---|---|---|---|
|  | 0.89 | 0.918 | 0.926 | 0.941 |
|  | (0.554) | (0.485) | (0.452) | (0.415) |
| Test | 0.91 | 0.947 | 0.955 | 0.966 |
| sequences | (0.46) | (0.373) | (0.356) | (0.318) |

Figure 10:
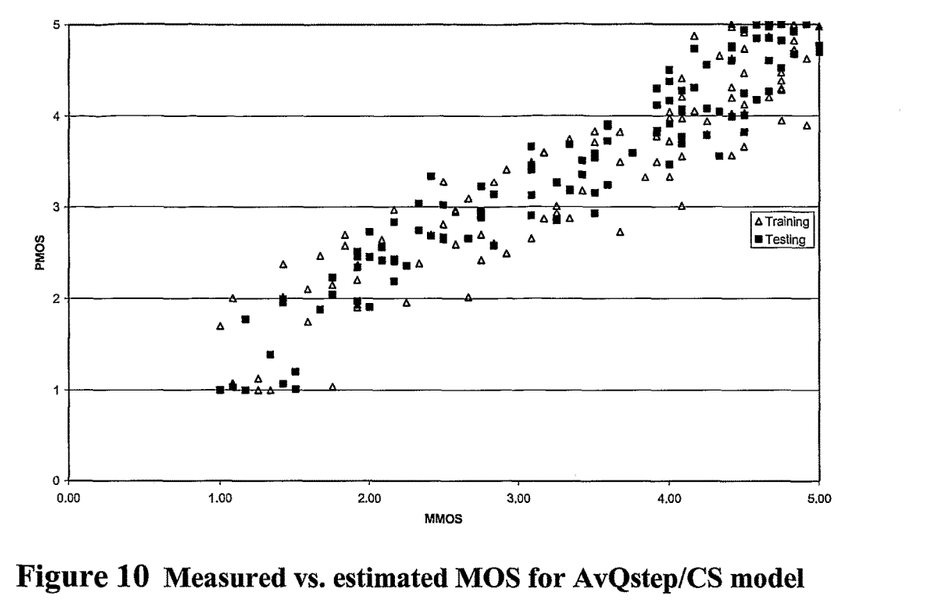
Figure 11:
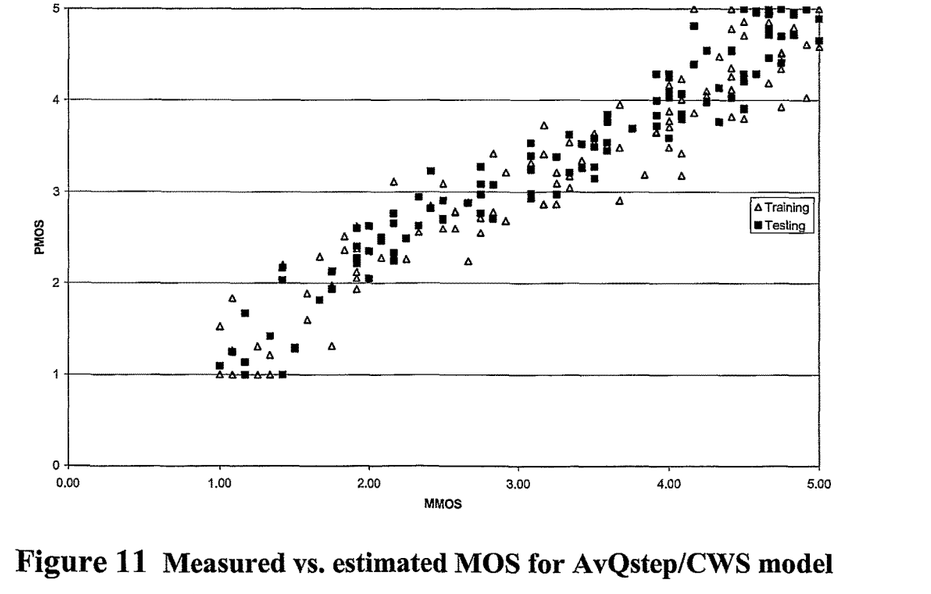

Results show that including the sequence-averaged regionally weighted contrast measure CWS in an AvQstep-based MOS estimation model markedly increases performance for both training and test data sets. The individual training and test results for the AvQP/CS and AvQP/CWS models are shown in the form of a scatter plots in FIGS. 10 and 11 respectively.

A number of variations in the above-described methods can be envisaged. For example, as described above, the quality measurement was performed in respect of the whole picture area apart from a border region excluded to avoid edge effects. If desired, however, the assessment could be restricted to a smaller part of the picture, area. This could be selected using known "visual attention" algorithms for identifying regions of interest within a picture. In another approach, computation of the measure AvQstep could be restricted to area K1 (or K4).

Where a picture contains macroblocks coded without the use of prediction, we find in practice that processing of these blocks in the manner described does not significantly affect the overall results. If however this becomes problematic, such macroblocks could be excluded from the process altogether.

CONCLUSIONS

Existing work [1] has shown that good prediction of subjective video quality may be achieved from a two-parameter model implemented within a video decoder. Here, it is shown that the existing technique, which uses measures based on quantizer step-size and average contrast, may be enhanced by the use of a new regionally weighted contrast measure CWS.

Firstly, a region of maximum activity K1 was defined to identify the most important areas of a picture using a count of non-zero quantized transform coefficients. A high proportion of non-zero quantized coefficients will tend to indicate a region that is difficult to predict and with a high degree of detail. These regions are potentially useful for regional analysis as they tend to attract visual attention and to be subjected to higher quantization effects.

The region of maximum activity K1 was then used to determine a contrast threshold C0Thresh for the assessment of the masking properties of the overall picture. Whilst parts of the picture not in region K1 are assumed to have lower visible distortion, their contrast properties can have an important effect on the perception of the overall distortion. High contrast areas that have been well predicted and therefore not included in region K1 can draw visual attention and provide general masking of distortions in K1. All areas of picture that have contrast properties above the threshold C0Thresh are included in a regionally weighted contrast analysis to give measure CWS. This technique benefits from the consideration of both high-activity low-contrast regions and low-activity high-contrast regions, both of which are important in the perception of quality.

Results are presented for eighteen different content clips, which have been MPEG-2 encoded at bit-rates of 700 Kbps up to 18 Mbps, and show the CWS measure to offer significant performance gains over the original model.

REFERENCES

[1] A. G. Davis, "No-reference Video Quality Prediction For a H.264 Decoder", to be published.
[2] ISO/IEC 13818-2 and ITU-T Rec. H.262: Information technology—Generic coding of moving pictures and associated audio information: Video, http://www.itu.int/rec/T-REC-H.262/en.
[3] Final report from the Video Quality Experts Group on the Validation of Objective Models of Video Quality Assessment, Phase 2, www.vqeg.org.
[4] ITU-T, J.144, "Objective perceptual video quality measurement techniques for digital cable television in the presence of a full reference".
[5] ITU-T, J.143, "User Requirements for Objective Perceptual Video Quality Measurements in Digital Cable Television".
[6] ISO/IEC 14496-10 and ITU-T Rec. H.264, Advanced Video Coding, 2003.
[7] VQEG1 sequence database, address: ftp://ftp.crc.ca/crc/vqeg/TestSequences/ALL_625/
[8] W. Osberger, S. Hammond and N. Bergmann, "An MPEG Encoder Incorporating Perceptually Based Quantisation," IEEE TENCON—Speech and Image Technologies for Computing and Telecommunications, pp. 731-733, 1997.
[9] Atul Puri and R. Aravind, "Motion-Compensated Video Coding with Adaptive Perceptual Quantization," IEEE Transactions On Circuits and Systems for Video Technology, Vol. 1, No. 4, pp 351-361, December 1991.
[10] Bo Tao, Bradley W. Dickinson and Heidi A. Peterson," Adaptive Model-Driven Bit Allocation for MPEG Video Coding," IEEE Transactions on Circuits and Systems for Video Technology, Vol. 10, No. 1, pp 147-157, February 2000.

What is claimed is:

1. A method of generating a measure of quality for a video signal representative of a plurality of frames, the video signal having: an original form; an encoded form in which the video signal has been encoded using a compression algorithm utilizing a variable quantizer step size such that the encoded signal has a quantizer step size parameter associated therewith and utilizing differential coding such that the encoded signal contains representations of the prediction residual of the signal; and a decoded form in which the encoded video signal has been at least in part reconverted to the original form, the method comprising:
   a) generating a first quality measure which is dependent on said quantizer step size parameter according to a predetermined relationship;
   b) generating a masking measure, the masking measure being dependent on the spatial complexity of at least part of the frames represented by the video signal in the decoded form according to a predetermined relationship; and
   c) generating a combined measure, the combined measure being dependent upon both the first measure and the masking measure according to a predetermined relationship;
   wherein the method also includes
   generating a second measure which is dependent on the prediction residual of the signal according to a predetermined relationship;
   identifying one or more regions of the picture for which the second measure exceeds a threshold;
   and wherein the masking measure is dependent on the spatial complexity of the identified one or more regions according to a predetermined relationship.

2. A method as claimed in claim 1, wherein the representations of the prediction residual are coefficients of a two-dimensional transform of the pixel-domain prediction residual, and the second measure is a calculated from said coefficients.

3. A method as claimed in claim 2, wherein the transform is a discrete cosine transform.

4. A method as claimed in claim 2, wherein the second measure is a count of the number of nonzero transform coefficients.

5. A method as claimed in claim 2, wherein the second measure is dependent on the amplitudes of the transform coefficients.

6. A method as claimed in claim 5, wherein the second measure is a function of the sum of the energies of the decoded coefficients.

7. A method as claimed in claim 1 in which the masking measure is a function of the spatial complexity of
   (a) the identified one or more regions of the picture for which the second measure exceeds a threshold and
   (b) a region or regions of the picture in which the second measure does not exceed the threshold but in which the spatial complexity exceeds a second threshold.

8. A method according to claim 7 in which the second threshold is dynamically varied, being a function of the spatial complexity calculated for the identified one or more regions.

9. A method according to claim 8 in which the second threshold is equal to the average value of the spatial complexity calculated for the identified one or more regions.

10. A method as claimed in claim 1 in which the first quality measure is derived only from those parts of the picture from which the masking measure is derived.

11. A method as claimed in claim 1, wherein the spatial complexity is measured by determining a local contrast measure at a plurality of positions in a frame.

12. A method as claimed in claim 11, wherein each frame includes plurality of pixels, and wherein for at least some of the pixels of a given frame, the comparison function is performed on neighboring regions in the vicinity of a pixel, so as to obtain a comparison value in respect of that pixel.

13. A method as claimed in claim 1, wherein the second measure is averaged over a plurality of frames.

14. A method of generating a measure of quality for a video signal representative of a plurality of frames, the video signal having: an original form; an encoded form in which the video signal has been encoded using a compression algorithm utilizing a variable quantizer step size such that the encoded signal has a quantizer step size parameter associated therewith and utilizing differential coding such that the encoded signal contains representations of the prediction residual of the signal; and a decoded form in which the encoded video signal has been at least in part reconverted to the original form, the method comprising:
   generating, using a computer processor, a first quality measure which is dependent on said quantizer step size parameter according to a predetermined relationship;
   generating a second measure which is dependent on the prediction residual of the signal according to a predetermined relationship;
   identifying one or more regions of the picture for which the second measure exceeds a threshold;
   generating a masking measure, the masking measure being dependent on the spatial complexity of at least part of the frames represented by the video signal in the decoded form according to a predetermined relationship, and the masking measure being dependent on the spatial complexity of the identified one or more regions according to a predetermined relationship; and
   generating a combined measure, the combined measure being dependent upon both the first measure and the masking measure according to a predetermined relationship.

15. A method as claimed in claim 14, wherein the representations of the prediction residual are coefficients of a two-dimensional transform of the pixel-domain prediction residual, and the second measure is a calculated from said coefficients.

16. A method as claimed in claim 14 in which the masking measure is a function of the spatial complexity of
   (a) the identified one or more regions of the picture for which the second measure exceeds a threshold and
   (b) a region or regions of the picture in which the second measure does not exceed the threshold but in which the spatial complexity exceeds a second threshold.

17. A method as claimed in claim 14 in which the first quality measure is derived only from those parts of the picture from which the masking measure is derived.

18. A method as claimed in claim 14, wherein the spatial complexity is measured by determining a local contrast measure at a plurality of positions in a frame.

19. A method as claimed in claim 18, wherein each frame includes plurality of pixels, and wherein for at least some of the pixels of a given frame, the comparison function is performed on neighboring regions in the vicinity of a pixel, so as to obtain a comparison value in respect of that pixel.

20. A method as claimed in claim 14, wherein the second measure is averaged over a plurality of frames.

\* \* \* \* \*